(12) United States Patent
Yang

(10) Patent No.: US 7,259,492 B2
(45) Date of Patent: Aug. 21, 2007

(54) ROTOR AXIAL ACTIVATION MODULATION OF ELECTRIC MACHINERY DUE TO REVERSE TORQUE

(76) Inventor: Tai-Her Yang, 6F-5 No. 250, Sec. 4, Chung Hsiao E. Rd., Taipei (TW)

(*) Notice: Subject to any disclaimer, the term of this patent is extended or adjusted under 35 U.S.C. 154(b) by 0 days.

(21) Appl. No.: 09/963,567

(22) Filed: Sep. 27, 2001

(65) Prior Publication Data

US 2003/0057793 A1    Mar. 27, 2003

(51) Int. Cl.
*H02K 1/06* (2006.01)
(52) U.S. Cl. .......................... 310/209; 310/78
(58) Field of Classification Search ................ 310/30, 310/191, 209, 83, 78
See application file for complete search history.

(56) References Cited

U.S. PATENT DOCUMENTS

| | | | | |
|---|---|---|---|---|
| 925,504 A * | 6/1909 | Porsche | .................. | 310/109 |
| 1,131,551 A * | 3/1915 | Price | .................. | 310/209 |
| 1,522,742 A * | 1/1925 | Parvin | .................. | 310/112 |
| 1,557,213 A * | 10/1925 | Lee | .................. | 388/803 |
| 2,446,393 A * | 8/1948 | Russell | .................. | 318/675 |
| 2,694,781 A * | 11/1954 | Hinz | .................. | 310/77 |
| 2,978,621 A * | 4/1961 | Martinek | .................. | 318/674 |
| 3,103,603 A * | 9/1963 | Reutter | .................. | 310/30 |
| 3,165,656 A * | 1/1965 | Korthaus et al. | .................. | 310/76 |
| 3,250,976 A * | 5/1966 | McEntire | .................. | 318/831 |
| 3,361,947 A * | 1/1968 | Schlebusch | .................. | 318/115 |
| 3,407,680 A * | 10/1968 | Westermoreland | .................. | 74/89.3 |
| 3,525,005 A * | 8/1970 | Beyers | .................. | 310/156.32 |
| 3,619,676 A * | 11/1971 | Kawakami et al. | .................. | 310/112 |
| 3,980,908 A * | 9/1976 | McClintock | .................. | 396/465 |
| 4,127,835 A * | 11/1978 | Knutson | .................. | 335/266 |
| 4,501,981 A * | 2/1985 | Hansen | .................. | 310/49 R |
| 6,249,069 B1 * | 6/2001 | Krueger | .................. | 310/74 |
| 6,700,268 B2 * | 3/2004 | Joong et al. | .................. | 310/114 |

* cited by examiner

*Primary Examiner*—Dang Le
(74) *Attorney, Agent, or Firm*—Bacon & Thomas, PLLC

(57) ABSTRACT

The invention involves installation of a helical nut structure, or a helical nut and ball or roller bearing structure, between an electric machinery transmission shaft and a driven transmission element. Depending on the torque between the electric machinery rotor, and on the loading or driving direction, the corresponding axial displacement of the electric machinery rotor can be controlled, and further the electric machinery characteristics relative to the electric machinery rotor and the electro-magnetic field can be modulated to achieve a desired control structure or testing device.

22 Claims, 19 Drawing Sheets

ROTOR AXIAL ACTIVATION MODULATION OF ELECTRIC MACHINERY DUE TO REVERSE TORQUE

BACKGROUND OF THE INVENTION (a) Field of the Invention

This invention relates to electrical machinery having at least one rotor that is axially displaceable relative to a magnetic field structure, as a result of reverse torque. The axial displacement may be achieved through the use of a helical mechanism and axial pre-stressed spring consist of a helical nut (and corresponding groove in the shaft) or helical nut with ball bearing or roller bearing structure that, during the operation of the electric machinery, depending on the magnitude of the torque between the electric machinery rotor and the load, produces axial displacement of the electric machinery rotor, and thereby either changes the coupling relationship between the rotor and the electric machinery magnetic field, pulls an axial control clutch CLS100, or pulls another selected control structure or testing device.

(b) Description of the Prior Art

Among the rotating electric machinery products currently being marketed there are electric machinery structures combining a tapered rotor and tapered recess electric machinery magnetic field. When activated the axial electro-magnetic attraction force will drive the axial, normally closed activation mechanism. Its function is to act as the axial driving power source to control the normally closed activation mechanism. However, its electric machinery characteristics cannot easily be varied.

SUMMARY OF THE INVENTION

The invention involves installation of a helical nut structure, or a helical nut and ball or roller bearing structure, between an electric machinery transmission shaft and a driven transmission element. Depending on the torque between the electric machinery rotor, and on the loading or driving direction, the corresponding axial displacement of the electric machinery rotor can be controlled, and further the electric machinery characteristics relative to the electric machinery rotor and the electro-magnetic field can be modulated to achieve a desired control structure or testing device.

DETAILED DESCRIPTION OF THE PREFERRED EMBODIMENTS

Electric machinery modulated by a rotor axially activated by reverse torque includes, according to the principles of the invention, a reverse activation helical structure situated between the electric machinery transmission shaft and the electric machinery rotor, or between the electric machinery transmission shaft and a transmission element being driven. The reverse activation helical structure includes a helical propeller structure or a helical propeller structure having a ball or roller bearing structure, which during the operation of the electric machinery, as a result of the reverse torque between the electric machinery rotor and the load, drives the electric machinery rotor to produce axial displacement, and further to modulate the electric machinery characteristics between the electric machinery rotor and the electric machinery magnetic field, to pull an axial controlling clutch CLS100, or to pull another selected control structure or testing device.

Figure 1:
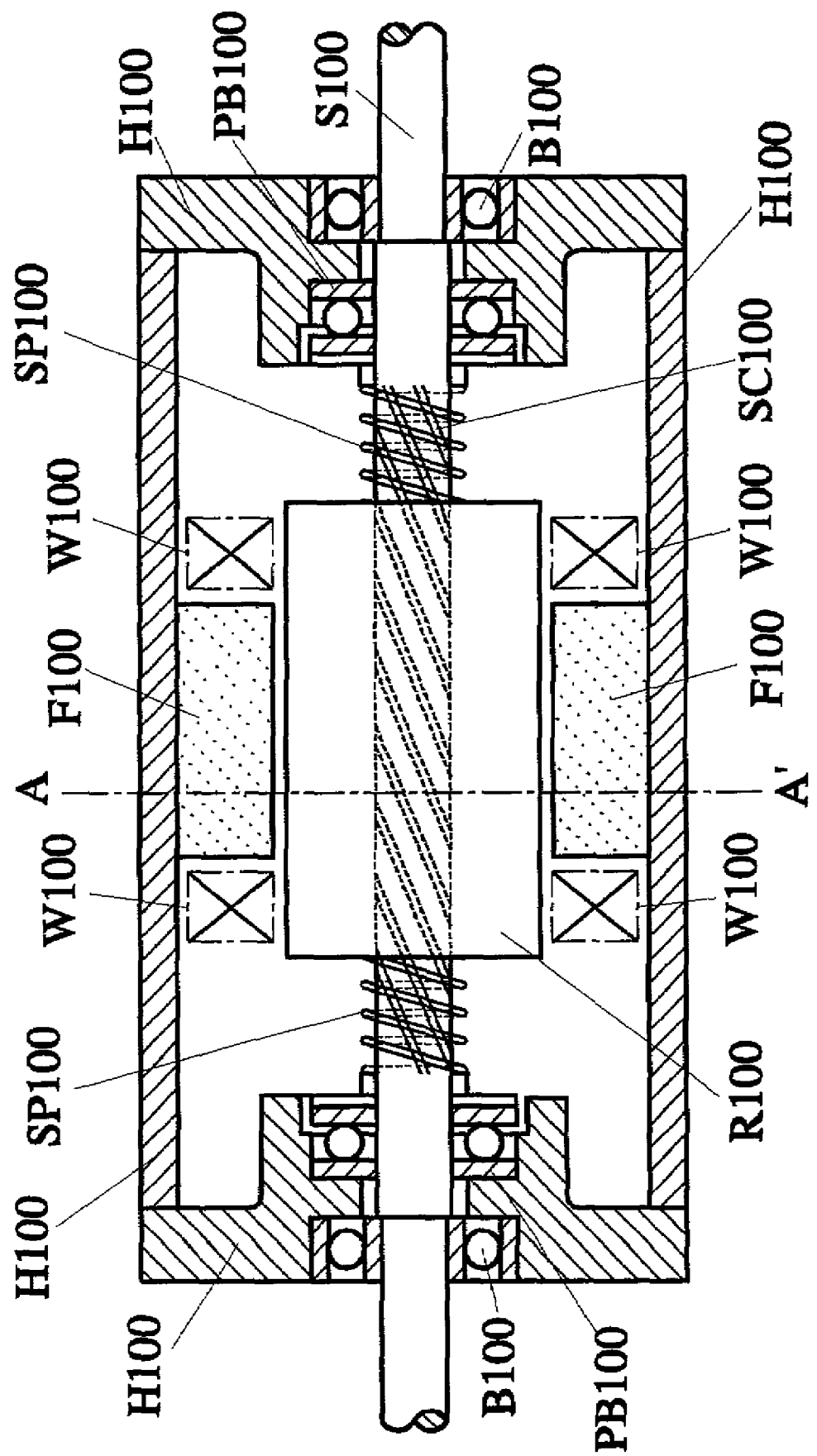
FIG. 1 is a cross sectional view of the main structure of this invention.
Figure 2:
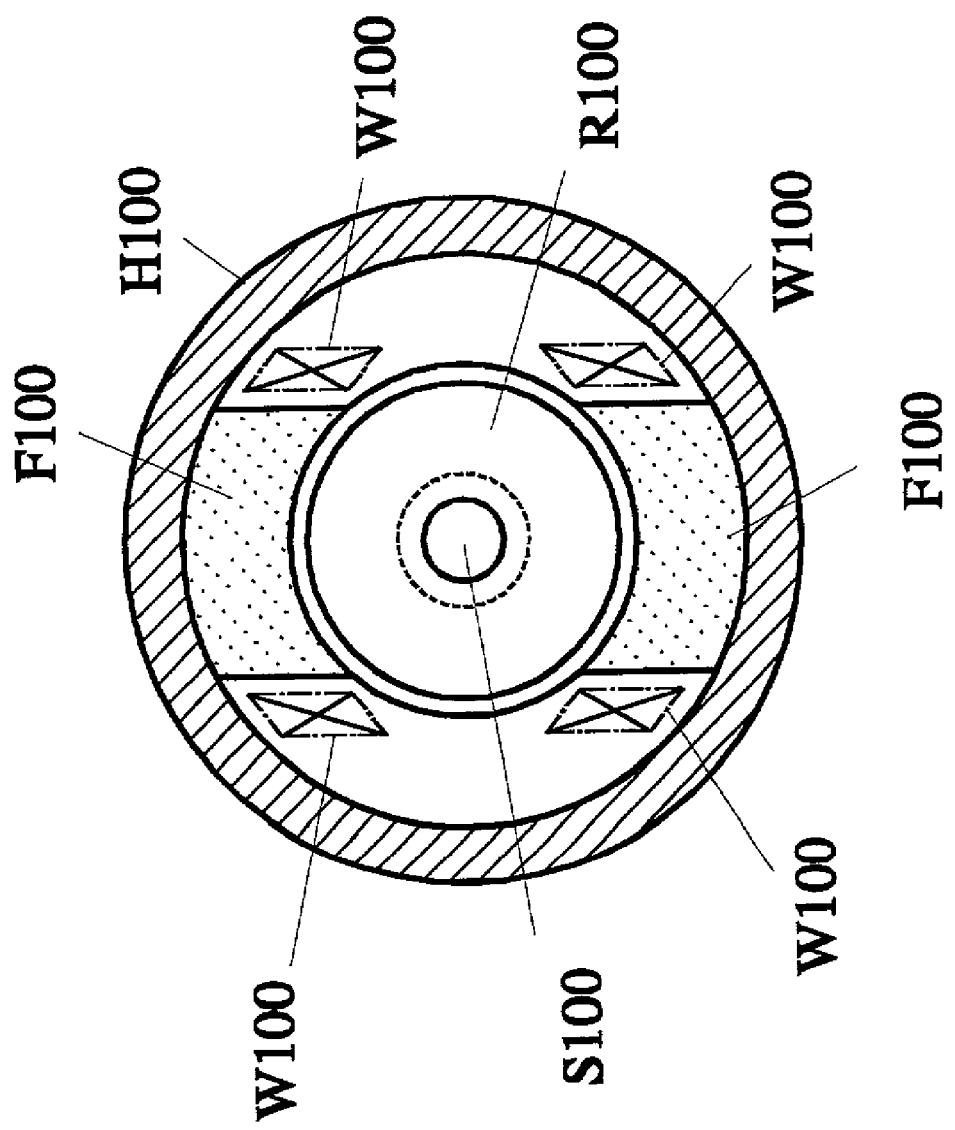
FIG. 2 is a cross sectional view taken along line A-A' in FIG. 1.
Figure 3:
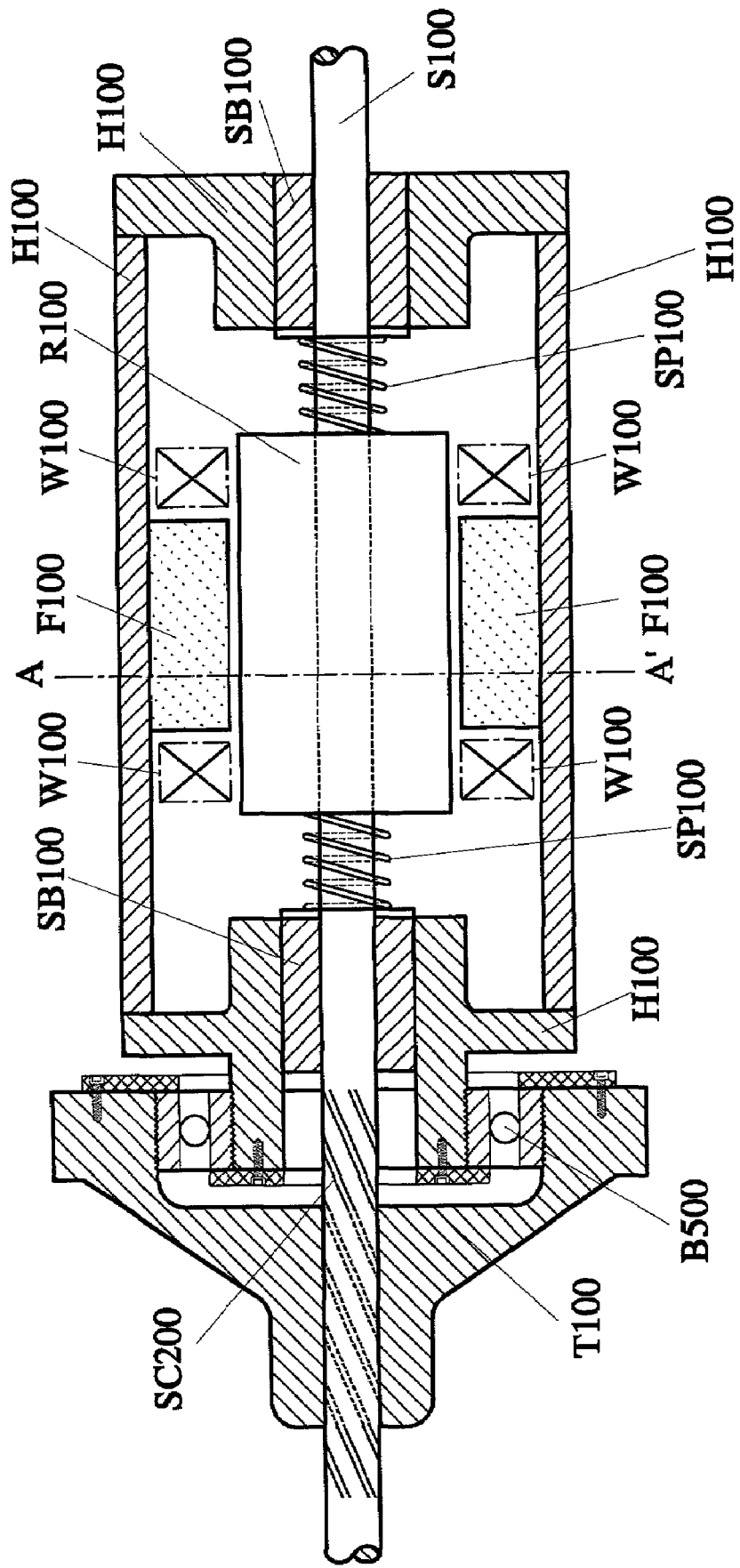
FIG. 3 is a cross sectional illustration of an embodiment of the invention in which a reverse activation helical structure is installed between the transmission shaft of the electric machinery and the load.

As shown in FIGS. 1 and 2, the major constituents of the invention include:

Electric machinery magnetic pole structure F100 including constituents of DC or AC generator or motor structures and magnetic field structures having one of the following configurations:

F1. The magnetic field or pole structure may be arranged such that the magnetic field between the pole structure and the rotor exhibits a normal stable even distribution; or F2: The field structure may be arranged such that magnetic fields between the axial single side or double sides of the field structure and the rotor exhibit different magnetic field intensities so that the magnetic coupling between the field structure and the rotor varies with axial displacement of the rotor; or F3: The magnetic fields between the axial single side or double sides of the pole structure and the rotor may be the result of different gap structures relative to the electric machinery rotor to also vary the magnetic coupling with axial displacement; or F4: The axial single side or double sides of the pole structure may consist of multiple permanent magnetic poles or magnetic poles excited by magnetic windings W100, or combinations of both which consist of axial serial structures to also vary the magnetic coupling with axial displacement; or F5: The pole structures may be formed by two or more of the structures described in F1 through F4 to vary the magnetic coupling with axial displacement;

Electric machinery rotor R100 includes single or mixed electric machinery rotors of the type used in various commonly used AC or DC generators or motors, such as permanent magnet, salient, hysteresis, wound, brush, turbo, squirrel-cage type AC or DC or brush or brushless, synchronous or asynchronous generators or motors, wherein the reverse torque structure for the rotor axial activation modulation includes:

(1) A reverse activation helical structure SC100 installed between the rotor R100 and a transmission shaft S100, including a helical propeller structure or helical propeller structure with a ball bearing or roller bearing structure, and a rotary bearing B100 and thrust bearing PB100 situated between the electric machinery rotor R100 and a single side or dual sides of the stator H100. The reverse activation helical structure SC100 further includes freely movable rotating axial pre-stressed spring SP100 arranged such that when the electric machinery rotor R100 and the transmission shaft S100 is operating as a generator or motor, the torque between the electric machinery rotor R100 and transmission shaft S100 acts on the reversible activation helical structure SC100 and produces axial displacement along preset direction, so as to modulate the electric field between the electric machinery rotor R100 and the electric machinery magnetic field F100, axially pull on controlling clutch CLS100, or pull other selected control structures or testing devices; or (2) The axial activation modulation of electric machinery due to reverse torque can best be understood from FIGS. 2 and 3 where, between the transmission shaft S100 of the electric machinery and the transmission structure T100 on the loading side, there is installed a reversible activation helical structure SC200 made up of a helical propeller structure or helical propeller structure with a ball bearing or a roller bearing structure, and where between the transmission shaft S100 of the electric machinery and the stator H100, there is installed a bearing SB100 for rotary driving and axial displacement, and a bearing SB100 for the transmission shaft S100 to perform rotary driving and axial displacement, and where between the electric machinery rotor and single side or dual sides of the stator H100 there is installed a freely movable rotating axial pre-stressed spring SP100 structure. A transmission structure T100 is provided on the output loading side and connected through the axial pulling resistance and rotating bearing B500 structure to the stator H100, such that when the electric machinery rotor R100 and the transmission shaft S100 is operating as a generator or motor, its reverse torque has the effect of producing axial displacement in a preset direction through the action of the reversible activation helical structure SC200 between transmission rotating shaft S100 and the transmission shaft on the loading side, so as to modulate the generator or electric machinery output or exert a pulling force in selected control structure or testing devices, as shown in FIG. 3; or (3) As described in (1) above, the electric machinery rotor R100 and transmission rotating shaft S100 may be installed with a reversible activation helical structure SC100 that includes a helical propeller structure or helical propeller structure with a ball bearing or roller bearing structure, and further includes using a human, mechanical, fluid, or electrically driven device to cause axial driving of the transmission shaft, modulate and set the relative positions of the electric machinery rotor R100 and magnetic field or pole structure F100 to actively control the electric machinery characteristics or to pull selected a control mechanism or testing devices In addition, depending on need, a relative displacement limitation or position locking device may be installed between electric machinery rotor R100 and transmission rotating shaft S100; or (4) As described in (1) above, installed between the electric machinery rotor R100 and transmission shaft S100 is a reversible activation helical structure SC100 that includes a helical propeller structure or helical propeller structure with a ball bearing or roller bearing structure. In addition, between the axial pre-stressed spring SP100 structure installed on its single side or both sides and stator H100, can be further installed a structural device driven by human, or mechanical, or fluid, or electrical power, so as to produce a pre-stressed control and axial displacement setting for the pre-stressed spring SP100, in order to actively control and set pre-stressed spring SP100 for axial pre-stress of the electric machinery rotor R100, to control and set the relative relationship of the electric machinery rotor R100 and electric machinery magnetic pole structure F100, and further to control the electric machinery characteristics or to a pull selected control mechanism or testing devices; or (5) As Described in (2) above, before installing the transmission shaft S100 and the transmission structure on the loading side T100, there is installed the reversible activation helical structure SC200 of helical propeller structure or helical propeller with a ball bearing or roller bearing structure. between the transmission shaft of the electric machinery rotor R100 and the stator H100, there is installed a bearing SB100 for the transmission shaft S100 to perform rotating driving and axial displacement, and between the electric machinery R100 and single side of double sides of the stator H100 there is installed a free movable rotating axial pre-stressed spring SP100 structure. Also included is a device using a human, or mechanical, or fluid, or electrical drive to produce reversal driving to the transmission shaft S100, further to control and set the relative position of the electric machinery rotor R100 and electric machinery magnetic pole structure F100, to actively control electric machinery characteristics or pull a selected control structure or testing device. In addition, depending on the need between the electric machinery rotor R100 and transmission shaft S100, there can be installed relative position limiting device or position locking device; or (6) As described in (2) above, between the transmission shaft S100 and the transmission structure on the loading side T100, there is installed a reversible activation helical structure SC200 including a helical propeller structure or the helical propeller structure with ball bearing or roller bearing, and between the transmission shaft S100 of the electric machinery rotor R100 and the stator H100 there is installed the bearing SB100 for the transmission shaft for rotating driving and axial displacement. Furthermore, between the electric machinery rotor R100 and single side or double sides of the stator H100 there is installed a freely movable mutating axial pre-stress spring SP100 structure, which uses human, mechanical, or fluid, or electrical driven relevant device, so as to perform pre-stressed control and axial displacement setting to the pre-stressed spring SP100, and actively control and set the axial pre-stress of the pre-stressed spring SP100 with respective to the electric machinery rotor R100, and to control and set the positional relationship between the electric machinery rotor R100 and electric machinery magnetic field F100, and further to control electric machinery characteristics or to pull selected control structure or testing device.

Figure 4:
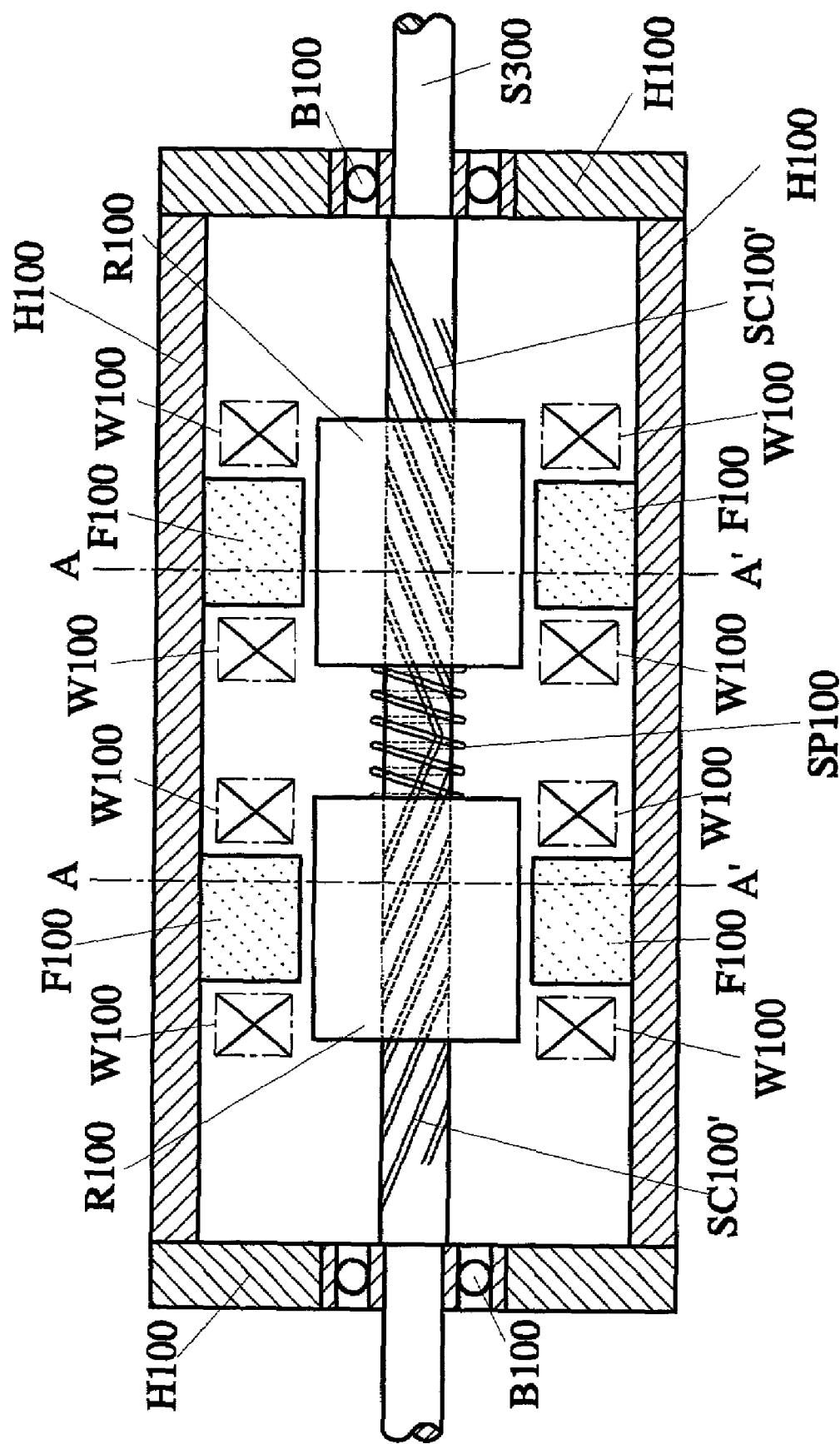
FIG. 4 is a cross sectional illustration of an embodiment of the invention in which a spring structure is installed between a dual electric machinery rotor formed in one body with the transmission shaft and dual electric machinery rotors.
Figure 5:
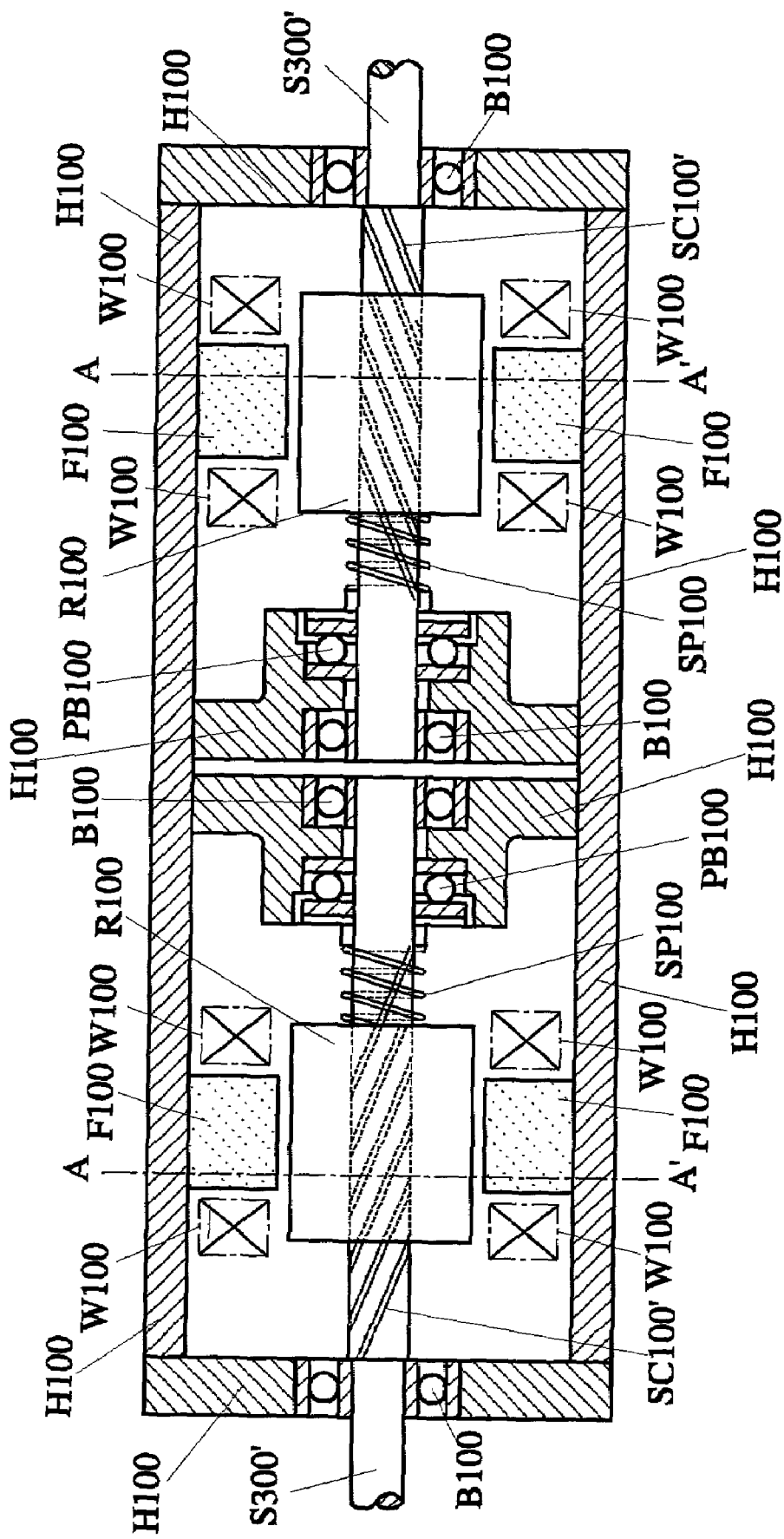
FIG. 5 is a cross sectional illustration of an embodiment of the invention in which dual electric machinery rotors are installed with two separate transmission shaft structures.
Figure 6:
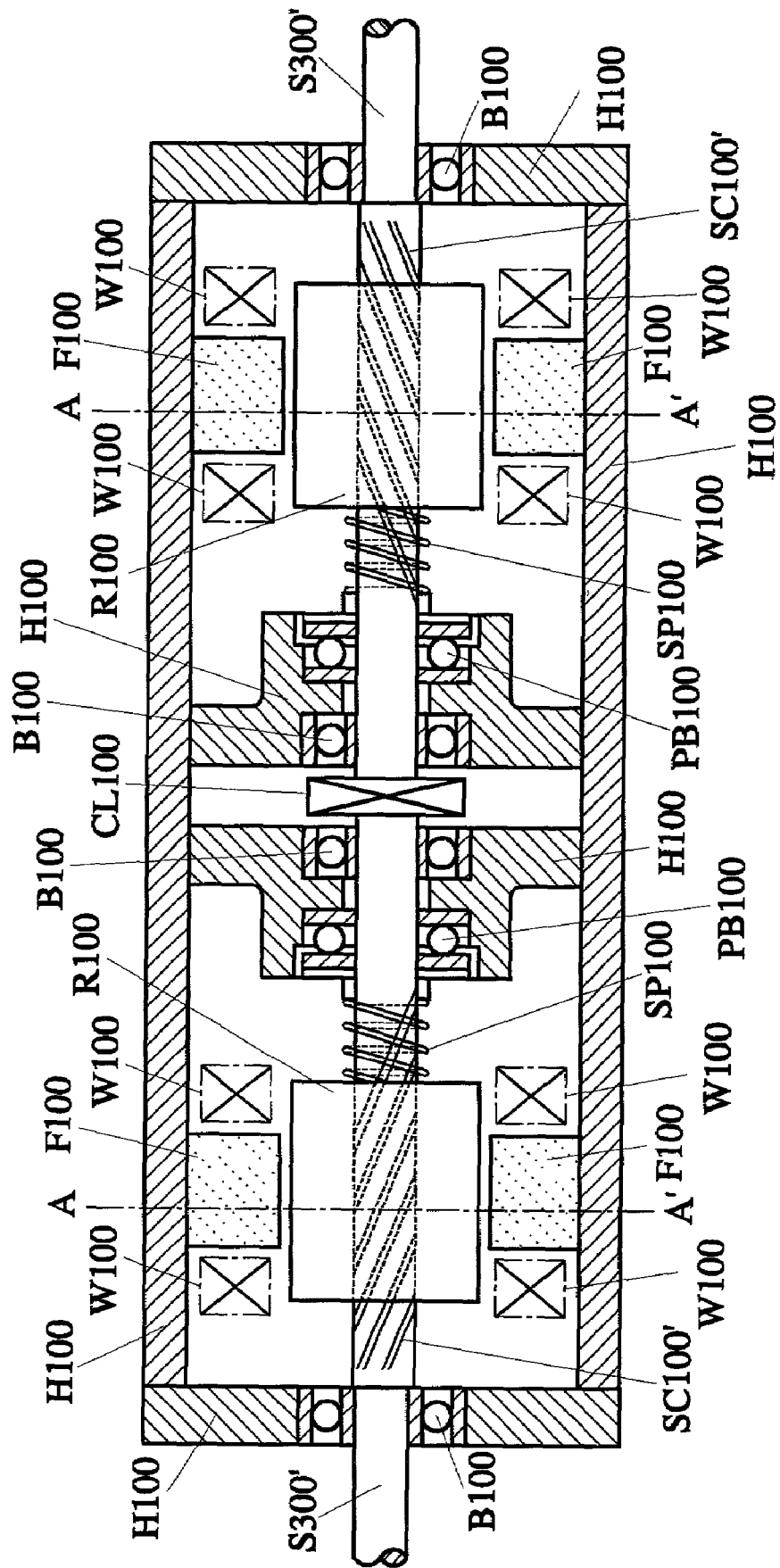
FIG. 6 is a cross sectional illustration similar to that of FIG. 5 in which a controllable clutch is installed between each individual transmission shaft.
Figure 7:
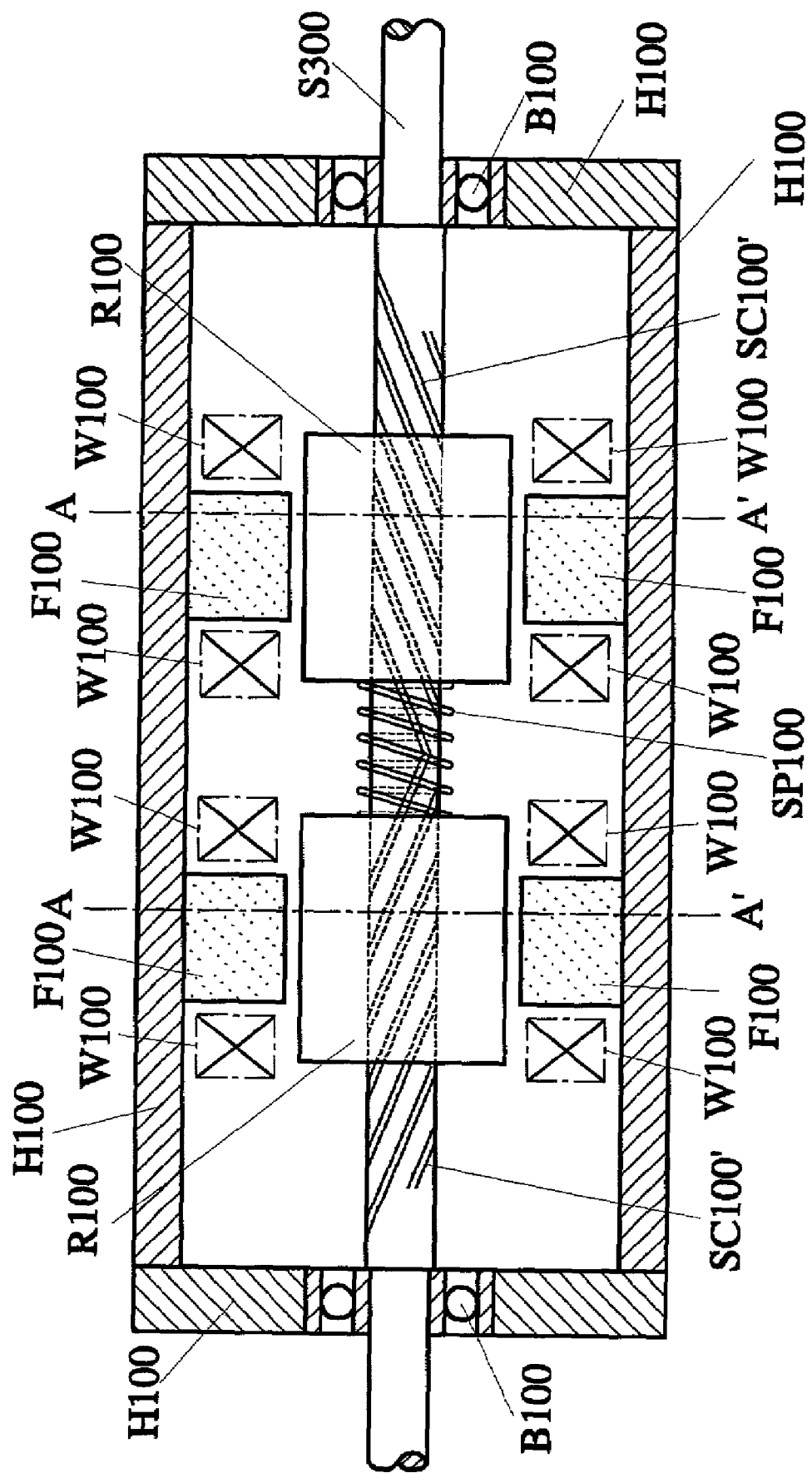
FIG. 7 is a cross sectional illustration of an embodiment of the invention in which a pre-stressed spring is installed between the two electric machinery rotors.
Figure 8:
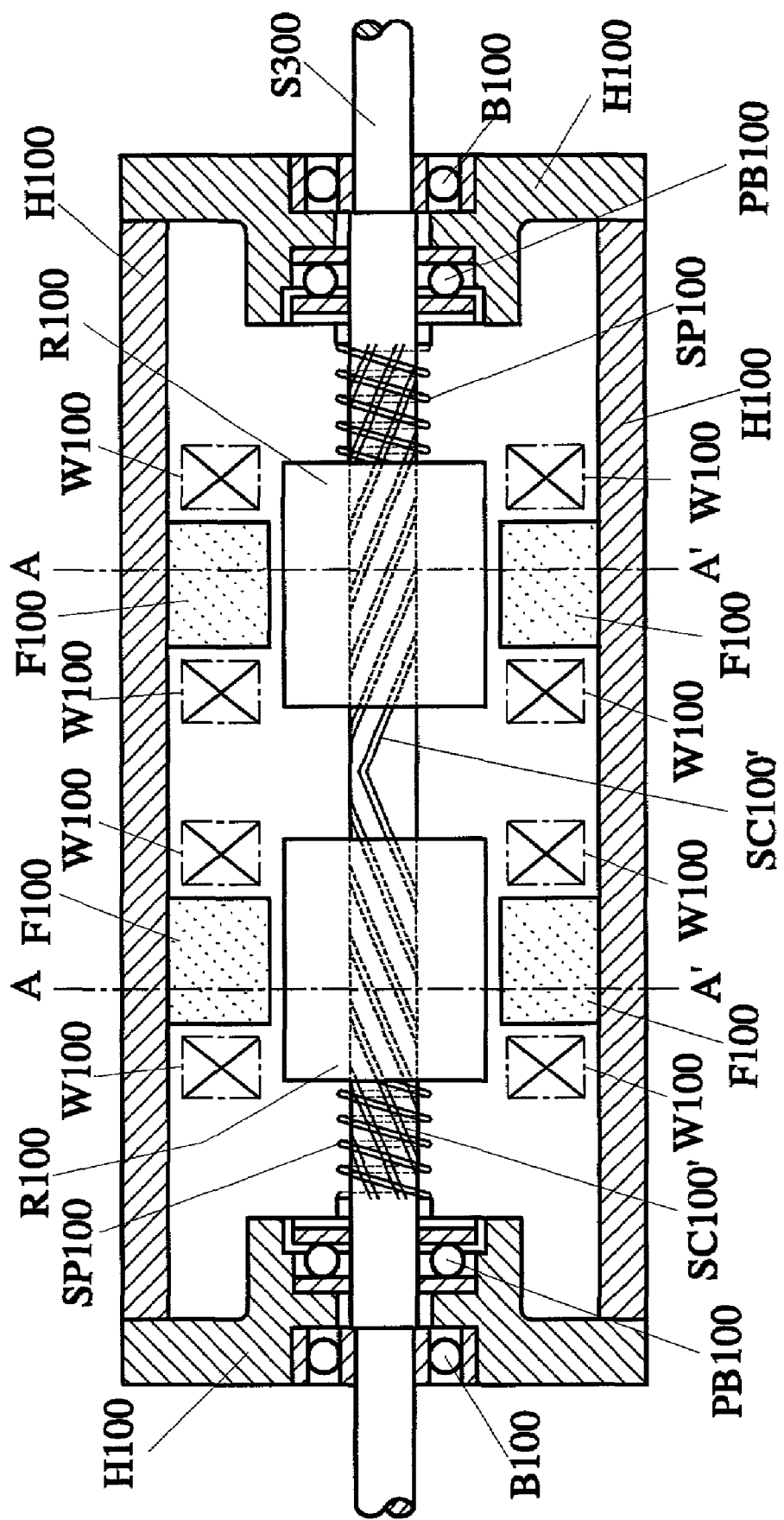
FIG. 8 is a cross sectional illustration of an embodiment of the invention in which the pre-stressed springs are installed on outer sides of the two electric machinery rotors.
Figure 9:
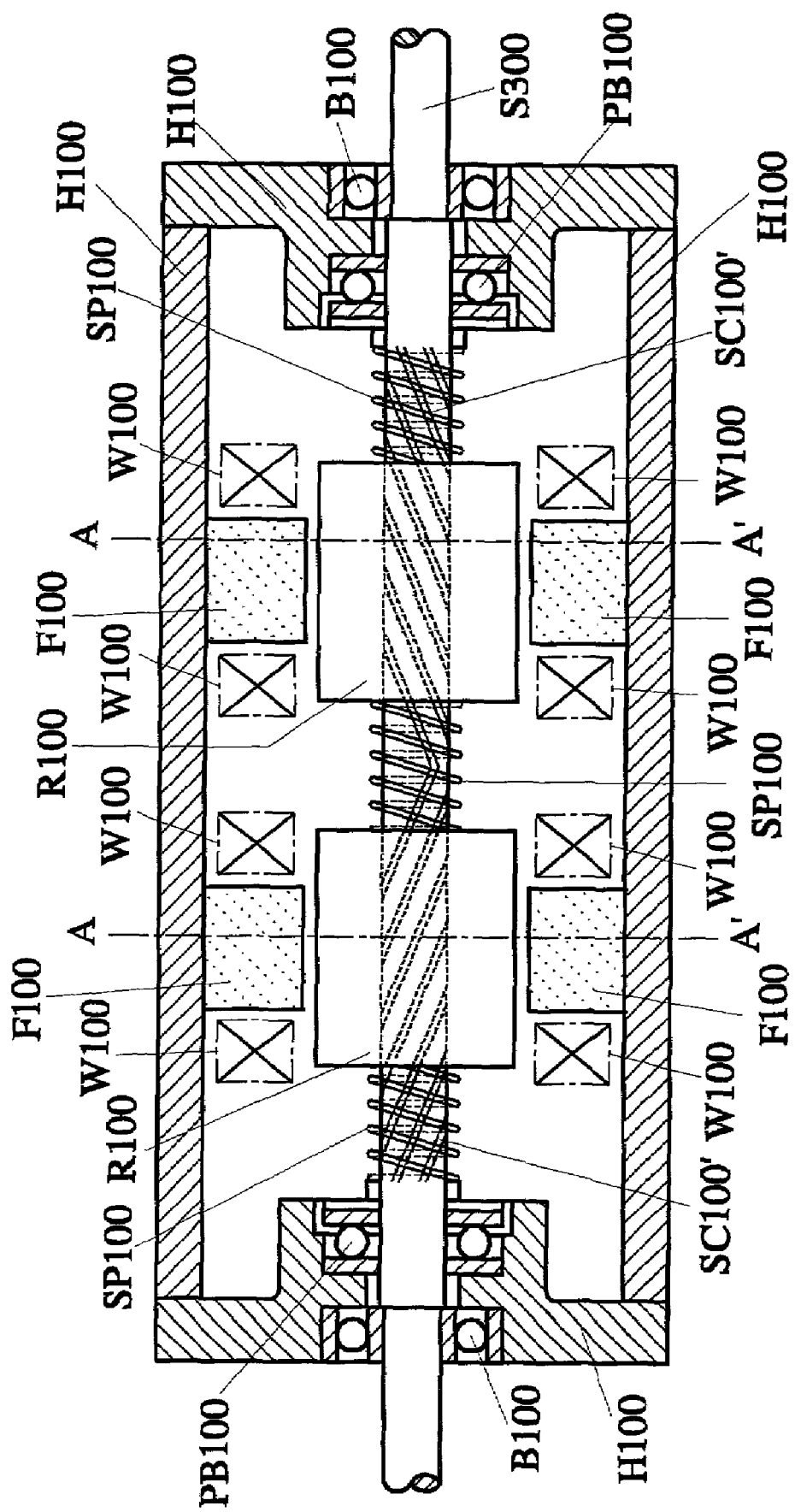
FIG. 9 is a cross sectional illustration of an embodiment of the invention in which pre-stressed springs are installed between the electric machinery rotors and on the outer sides.

According to a modification of the above-described embodiments, the helical propeller structure can further consist of a transmission shaft S300 with two sections supporting a clockwise (CW) and counter clockwise helical propeller or reversible activation helical structure SC100 including a helical propeller with ball bearing or roller bearing, to couple with the two individual electric machinery rotors R100. Between the two electric machinery rotors may be installed a pre-stressed spring SP100. The previously described transmission shaft S300 of the dual electric machinery rotors include the one body transmission shaft structure. FIG. 4 shows a cross sectional illustration of this invention where dual electric machinery rotors are fixed to a one body transmission rotating shaft while between the two rotors there is installed a pre-stressed spring structure. The cross sectional illustration along A-A' is the same as FIG. 2; or may consist of two sections of individual transmission shaft S300', as shown in FIG. 5, which is a cross sectional illustration of this invention showing two electric machinery rotors with two sections of individual transmission rotating shaft structure, of which the cross sectional illustration along A-A' is the same as FIG. 2; or further between the two individual transmission shaft S300' there can be installed the clutch CL100 using human, or mechanical, or fluid, or electrical power so as to combine the two electric machinery rotors for connection operation or for individual separate operation, as shown in FIG. 6. FIG. 6 is a cross sectional illustration of the embodiment illustrated in FIG. 4, where between the two individual transmission shafts there is installed a controllable clutch, its cross sectional illustration along A-A' being the same as in FIG. 2e. The previously described two individual electric machinery rotors R100 are coupled to their individual electric machinery magnetic pole structures F100, and between the two electric machinery rotors there is installed pre-stressed spring SP100, the two individual electric machinery rotors R100 optionally being electric machinery rotors with the same characteristics or different characteristics, the two electric machinery magnetic pole structures F100 being coupled by the two electric machinery rotors also generating electric machinery magnetic fields of same or different characteristics. The modulation elements, in the form of axial pre-stressed springs, may be installed in any of the following arrangements:

(1) Axial pre-stressed spring SP100 may be installed between two electric machinery rotors R100, with one of them generating a reverse torque in the direction of rotation increases, and the two individual electric machinery rotors R100 exhibiting mutually complementary axial displacement, as shown in FIG. 7 (it will be appreciated that the cross-sections along lines A-A' in each of 7-19 will be the same as shown in FIG. 2;

(2) Axial pre-stressed springs SP100 may be installed on axially opposite outside sides of the two electric machinery rotors R100, with one of them generating are verse torque in the direction of rotation increases, the two individual electric machinery rotors R100 exhibiting mutually opposite axialon displacement, as shown in FIG. 8;

(3) Axial pre-stressed spring SP100 may be installed between the two electric machinery rotors R100 and also on the axially opposite outer sides, with the positive or reverse torque in the direction of rotation increases, the two individual electric machinery rotors R100 exhibiting complementary or opposite axial displacement, as shown in FIG. 9.

Similarly, FIG. 5 is shows an embodiment including two electric machinery rotors with individual transmission structures, while FIG. 6 shows an embodiment in which the individual transmission shafts are installed with controllable clutches. The principle of installation for the pre-stressed spring(s) is the same for each embodiment.

Figure 10:
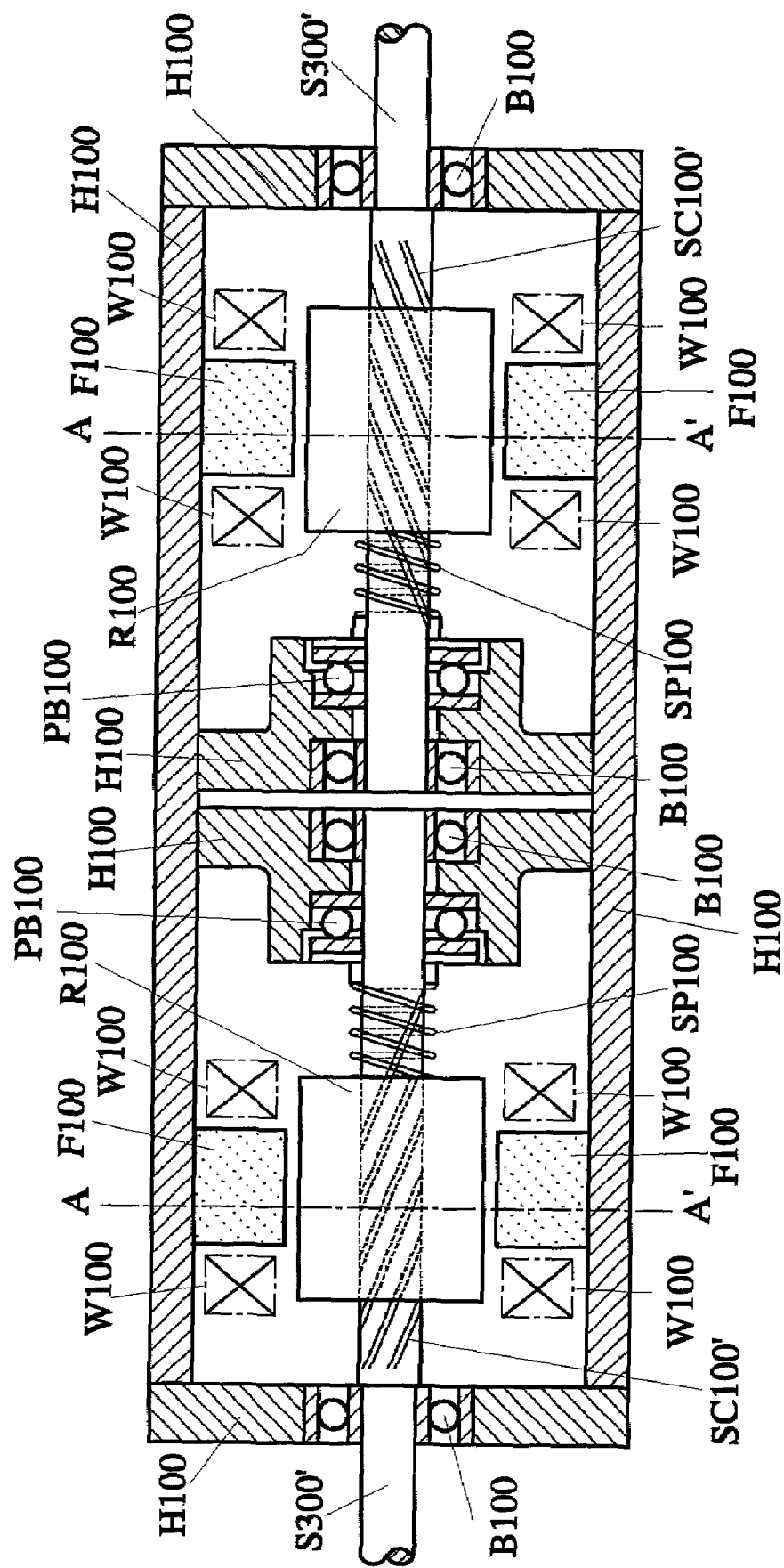
FIG. 10 is across sectional illustration of the invention in which the two electric machinery rotors have individual transmission shafts and pre-stressed springs are installed between the electric machinery rotors.

As shown in FIG. 10, the two electric machinery rotors may each have their own transmission shaft with the pre-stressed springs installed between the two electric motors.

Figure 11:
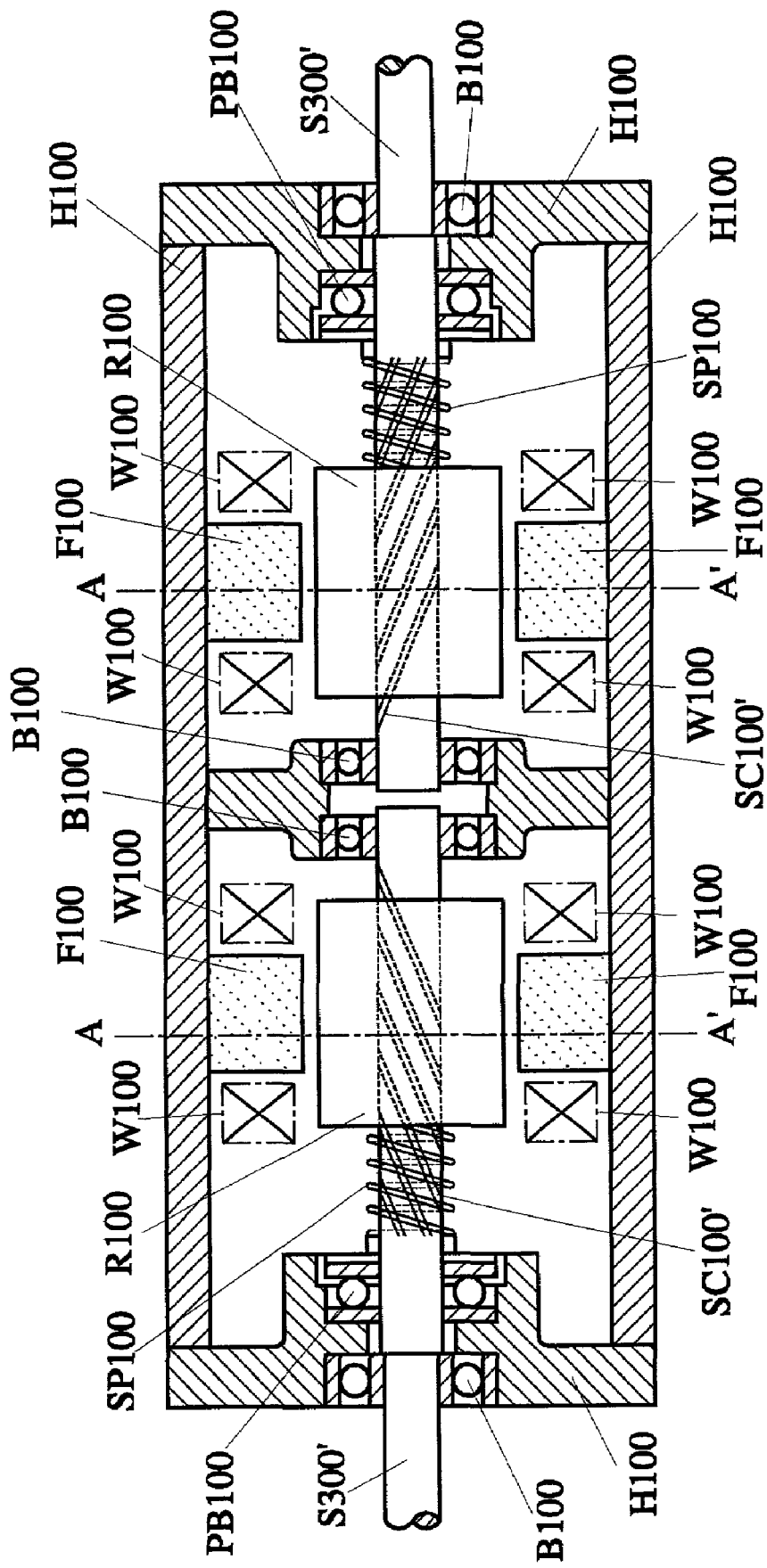
FIG. 11 is a cross sectional illustration of an embodiment of the invention in which the two electric machinery rotors have individual transmission shafts and pre-stressed springs are installed between the electric machinery rotors and the stator.

As shown in FIG. 11, the two electric machinery rotors may again each have their own transmission shaft and a pre-stressed spring may be installed between the two electric machinery rotors and the outer stator.

Figure 12:
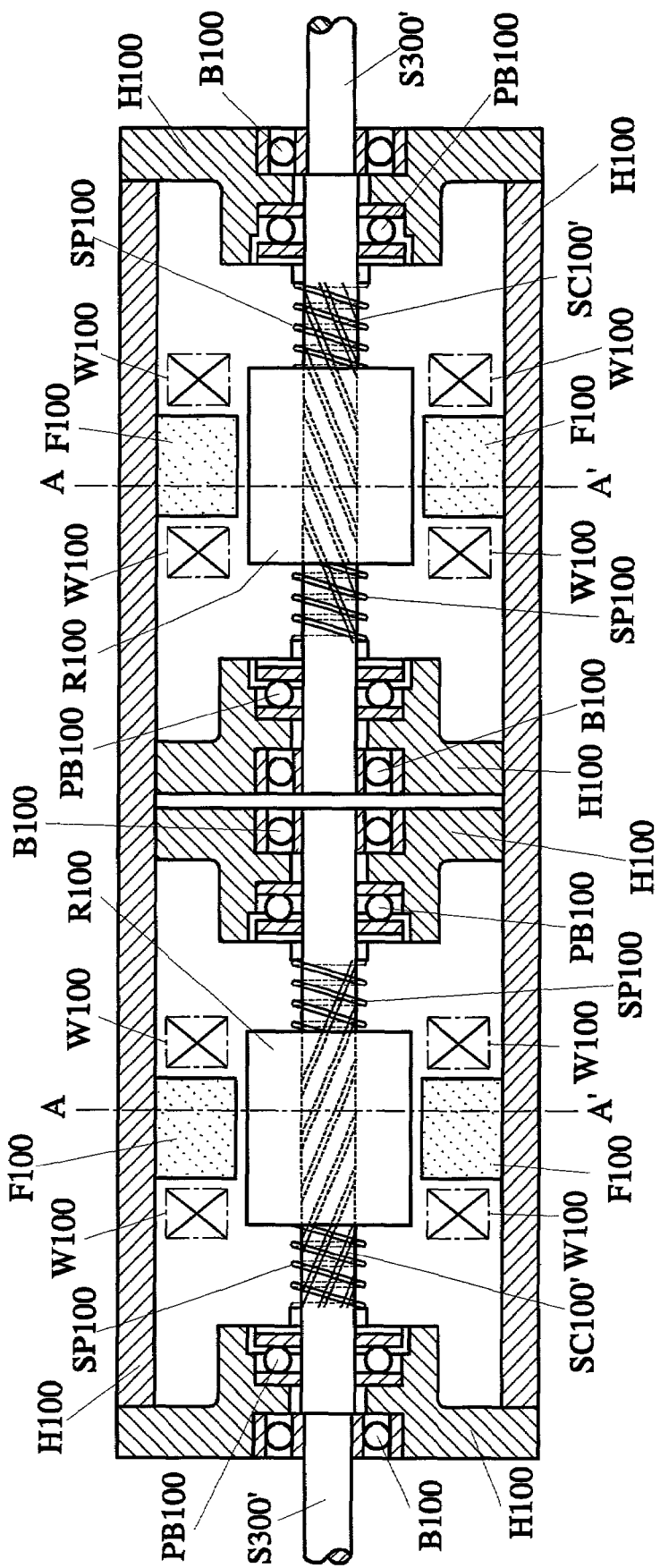
FIG. 12 is a cross sectional illustration of an embodiment of the invention in which the two electric machinery rotors have individual transmission shafts and pre-stressed springs are installed between the electric machinery rotors and between the individual electric machinery rotors and the stator.

As shown in FIG. 12, the two electric machinery rotors may each have their own transmission shaft and pre-stressed springs may installed between the two electric machinery rotors and between the two electric machinery rotors and the outer stator.

Figure 13:
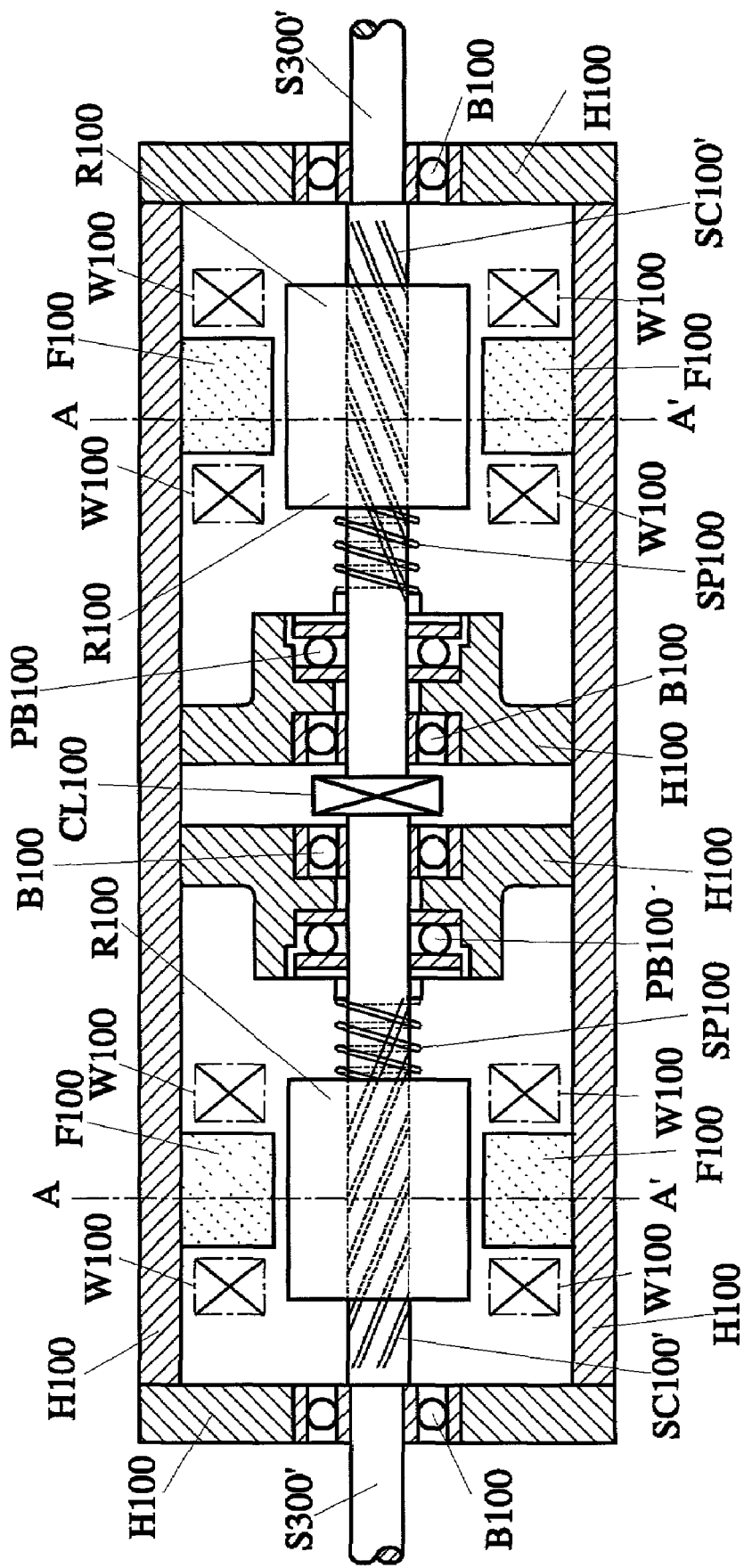
FIG. 13 is a cross sectional illustration of an embodiment of the invention in which controllable clutches are installed between the transmission shafts of the two electric machinery rotors and a pre-stressed spring is installed between the two electric machinery rotors.

As shown in FIG. 13, controllable clutches may be installed between the individual transmission shafts of the two electric machinery rotors and pre-stressed springs may be installed between the two electric machinery rotors.

Figure 14:
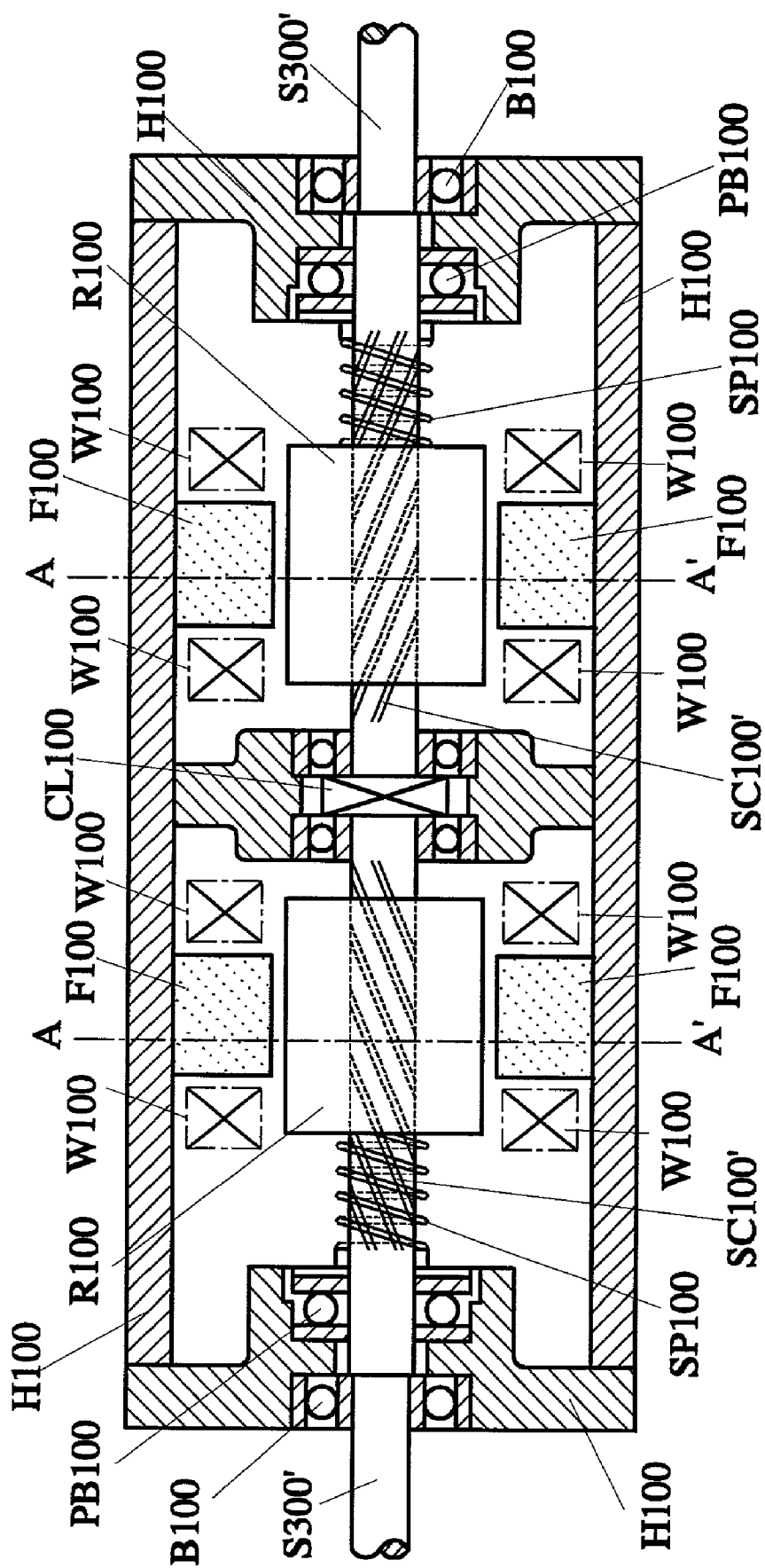
FIG. 14 is a cross sectional illustration of an embodiment of the invention in which controllable clutches are installed between the transmission shafts of the two electric machinery rotors and a pre-stressed spring is installed between the two electric machinery rotors and the stator on axially outside facing sides of the rotors.

As shown in FIG. 14, controllable clutches may be installed between the individual transmission shafts of the two electric machinery rotors and pre-stressed springs may be installed between the two electric machinery rotors and the outer stator.

Figure 15:
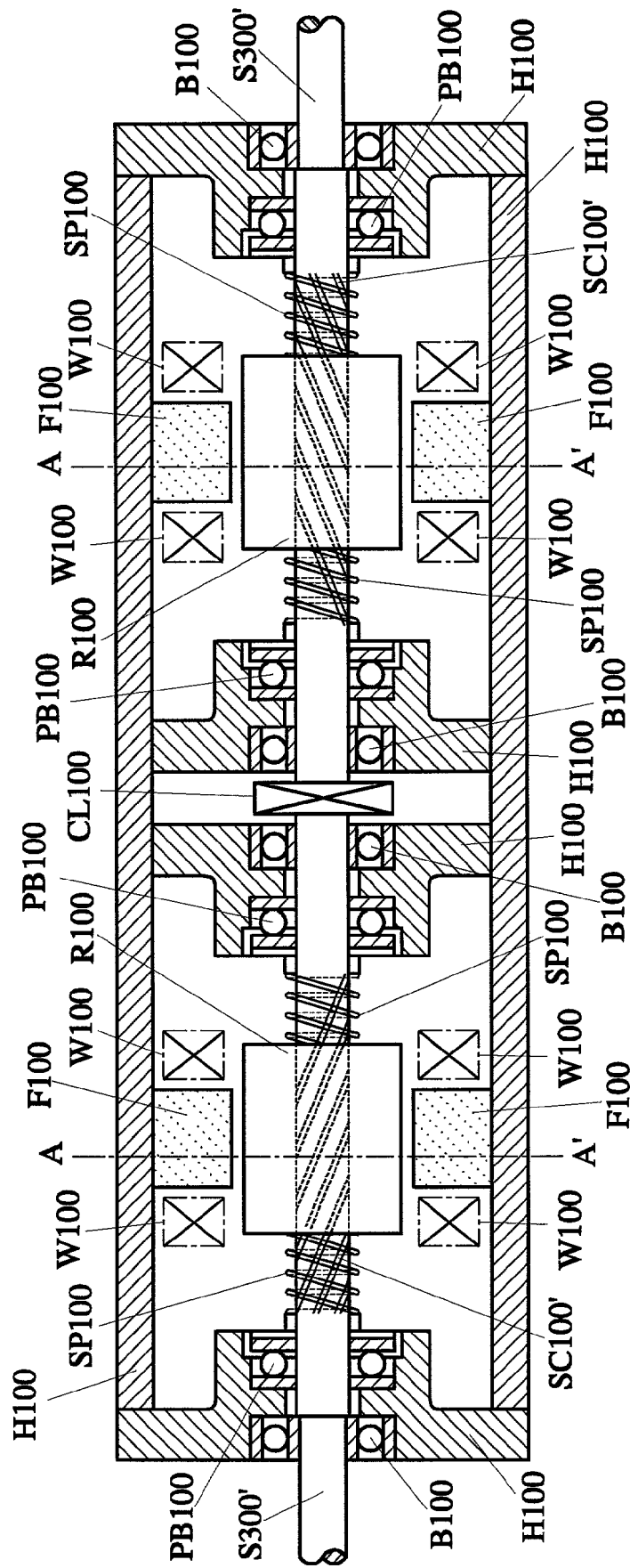
FIG. 15 is a cross sectional illustration of an embodiment of the invention in which controllable clutches are installed between the transmission shafts of the two electric machinery rotors and pre-stressed springs are installed between the two electric machinery rotors and between the individual electric machinery rotors and the stator on axially outside facing sides of the rotors.

As shown in FIG. 15, controllable clutches may be installed between the individual transmission shafts of the two electric machinery rotors and pre-stressed springs may be installed between the two electric machinery rotors and between the two electric machinery rotors and the outer stator.

The above stated dual electric machinery rotor structures can be installed in manual, mechanically driven, hydraulic, or electrically driven devices so as to perform reversal driving of the transmission shaft, and further to modulate and set the relative position of the electric machinery rotor and electric machinery magnetic field, so as to actively modulate electric machinery characteristics. The rotor structures can further selectively include a relative displacement limitation device or fixed positioning locking device between the electric machinery rotor and the transmission shaft.

in the above described electric machinery with dual electric machinery rotors, the individual electric machinery magnetic field structures may both be generators or motors, or one may be a generator and the other a motor structure.

The axial stack height of the magnetic core of the rotor R100 may have the following relationships to the magnetic field or pole structure:

(1) The axial stack height of the magnetic core of the electric machinery rotor is greater than that of the electric machinery magnetic field structure;

(2) The axial stack height of the magnetic core of the electric machinery rotor is equal to that of the electro-magnetic field structure;

(3) The axial stack height of the magnetic core of the electric machinery rotor is less than that of the electro-magnetic field structure.

Figure 16:
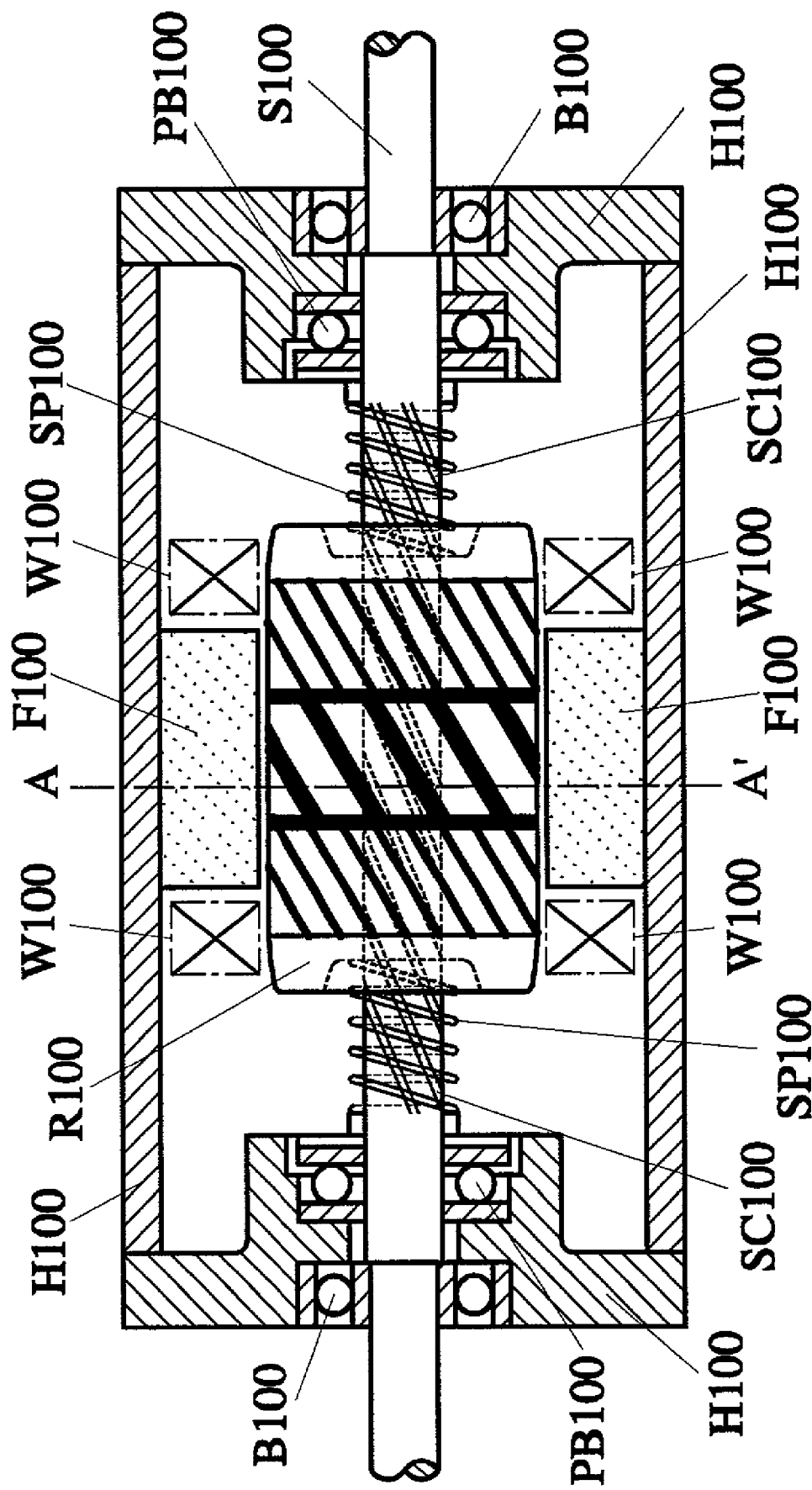
FIG. 16 is a cross sectional illustration of a preferred embodiment of the invention that forms an axial multiple circuit squirrel cage rotor structure.
Figure 17:
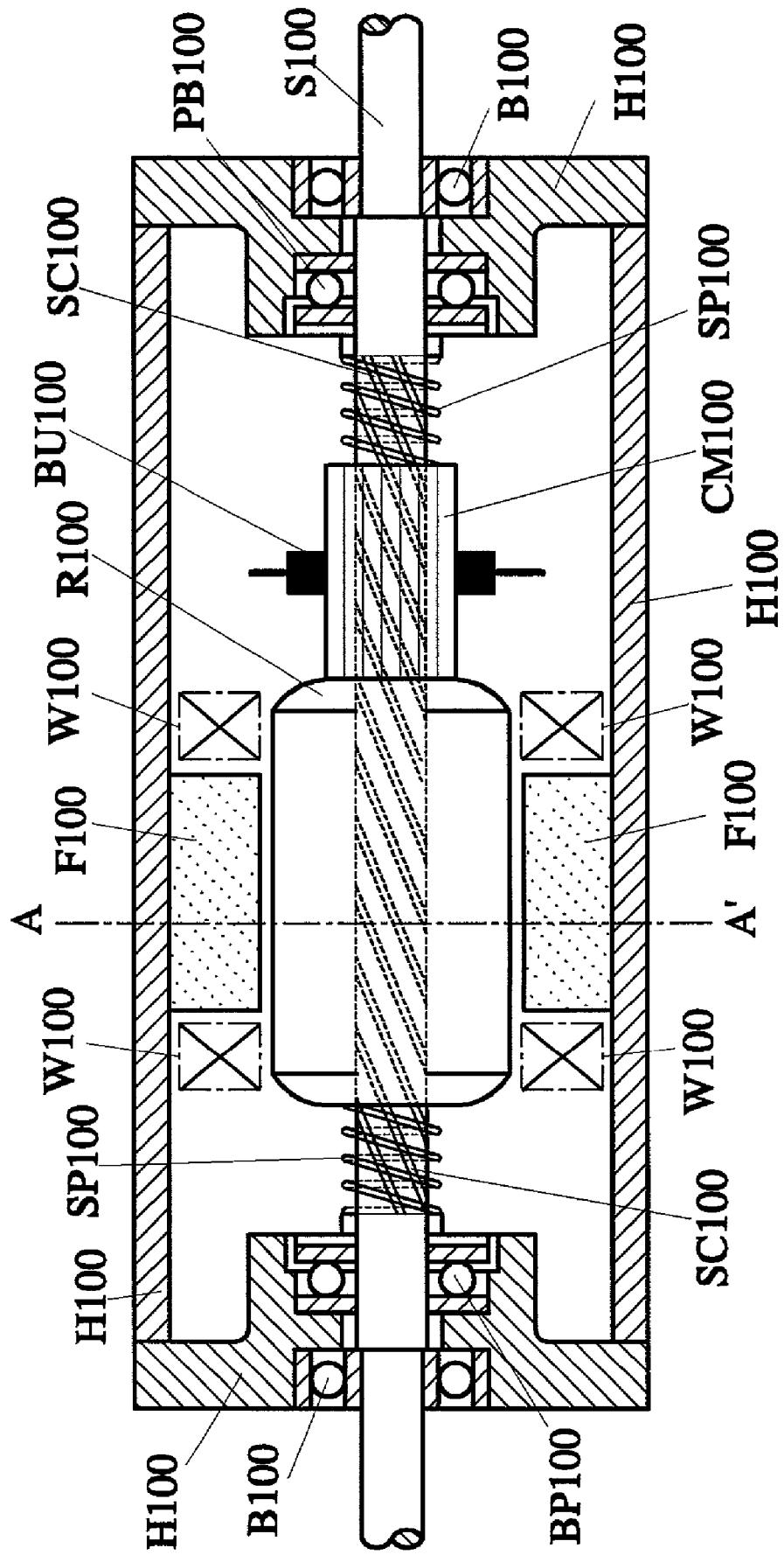
FIG. 17 is a cross sectional illustration of a preferred embodiment of the invention including an axial extension brush armature.
Figure 18:
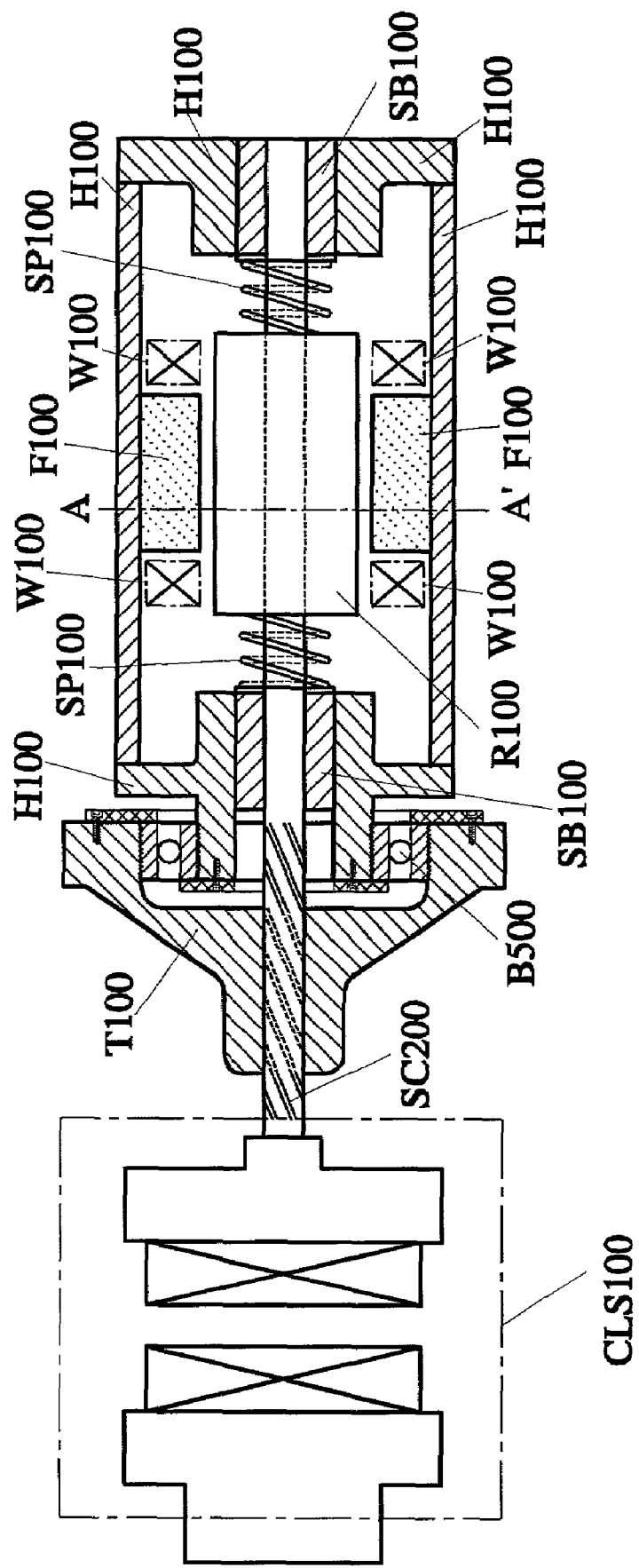
FIG. 18 is a cross sectional illustration of a preferred embodiment of the invention that employs a reverse torque to produce axial activation in order to pull an axial control clutch.
Figure 19:
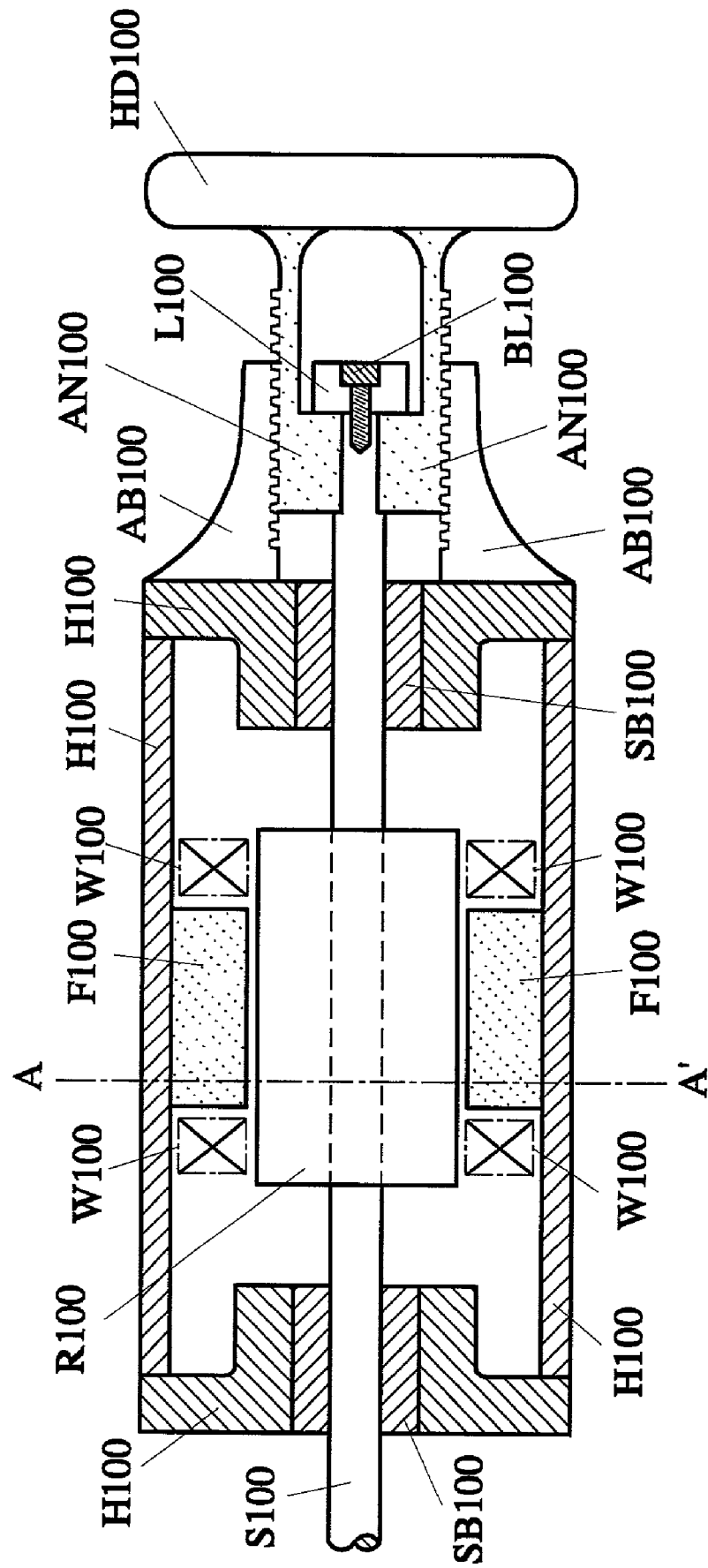
FIG. 19 is a cross sectional illustration of a preferred embodiment of the invention applied to an electric machinery magnetic field or electric machinery rotor for axial modulation settings.

The modulation of electric machinery due to reverse torque and the resulting axial displacement between the electric machinery rotor and electric machinery magnetic field, can be varied by means of controllable voltage, current, frequency, etc. inputs versus output linear characteristics of the electric generator, and controllable motor speed, torque, synchronous or asynchronous, etc. input versus output linear characteristics, or by a pulling axial control clutch CLS100 or other selected control mechanism or testing device, as follows:

(1) When the axial stack height of the magnetic core of the electric machinery rotor is greater than that of the electric machinery magnetic field structure, the modulation method of the electric machinery of the invention modulates the relationship between the magnetic poles of the electric machinery rotor and the electric machinery magnetic field as a result of the corresponding axial displacement generated by centrifugal force, so as to couple the electric magnetic machinery rotor with fixed characteristics by means of a different magnetic flux density or different gap, or by means of different magnetic properties or excitation method, or by means of any other different structure resulting in a different electric machinery physical property, so as to generate the needed operation and output characteristics of the generator or motor or to pull a selected control mechanism or testing device;

(2) When the axial stack height of the magnetic core of the electric machinery rotor is greater than that of the electro-magnetic field, the modulation method makes use of the magnetic poles of the electric machinery rotor and the magnetic poles of the electro-magnetic field to generate axial pulling displacement by using the reverse torque. The electric machinery rotor coupled by the electric machinery magnetic field can be an axial multiple-section circuit squirrel-cage rotor structure, and each section of squirrel-cage rotor structure can have different electric machinery characteristics, as shown in FIG. 16; rotors excited by windings; rotors consisting of permanent magnetic type, salient type, hysteresis type, or eddy current type rotor structures having an outer diameter that varies in an axial direction; or an armature of a commutator type electric machinery rotor arranged to match the axial activation modulation displacement and with specific axially extended commutator CM100, so as to increase the coupling range with electric brush BU100, as shown in FIG. 17. By re-arranging the various alternating current or direct current and brush or brushless electric machinery rotor, specifically with different outer diameters, different numbers of poles, different methods of excitation, or different electric machinery rotor characteristics or structures, a desired operation and characteristics of a generator or motor and the transmission characteristics or pulling of a selected control mechanism or testing device can be achieved;

(3) The previously described, in (1) and (2) above, electric machinery magnetic field structure and electric machinery rotor with different physical characteristics and different electric machinery structure, produces the selected generator or motor operation characteristics by using reverse torque for axial activation modulation of electric machinery, to pull axial control clutch CLS100, or to pull another selected control mechanism or testing device, as shown in FIG. 18;

(4) The previously described, in (1) and (2) above, electric machinery magnetic field and electric machinery rotor with different physical characteristics and different electric machinery structure may be combined with a controllable electric machinery rotor to perform axial displacement and position setting, by externally using manual, mechanical, fluid, or electromagnetic effect driving, so as to modulate the relative electric machinery relative coupling position between the electric machinery rotor and the electric machinery magnetic field, and further to modulate the electric machinery operation characteristics, as shown in FIG. 19. The electric machinery of this embodiment makes use of one side of the rotating electric machinery stator for the installation of an internal circular helical structure axial modulation seat AB100, for coupling to circular pulling block AN100, the outer side of the circular pulling block AN100 being installed with a helical structure for coupling to the inner circular helical structure of axial modulation seat AB100, the threads of both helical structures being of irreversible transmission type. Circular pulling weight AN100 enables the circular weight block L100 and fixed screw BL100 to be fixed to the stepping section where the rotating shaft outer perimeter is smaller, so that when the circular pulling weight AN100 is rotated by the hand wheel HD100 or pulled by some other human or mechanical or fluid or magnetic structure, it can perform axial single or double directional pulling of transmission shaft S100, so as to change the relative coupling positions between the electric machinery rotor connected to the transmission shaft S100 and the electric machinery magnetic field, and further to modulate the electric machinery characteristics. The circular pulling weight AN100 and transmission shaft S100 can be relatively rotatable, and depending on the need, there can be installed a bearing or lubricant sleeve structure.

The axial modulation preset structure example of FIG. 19 above, due to its many structures with similar functions, can be modified in many ways, and is not used to limit the applications. Other structures with the same functions can be derived from commonly known related functional structures.

The axial rotor modulation of electric machinery due to reverse torque, its mechanical relative displacement varying a relationship between the electric machinery rotor and electric machinery magnetic field structure, may make use of:

(1) External electric machinery rotor structures;
(2) Internal electric machinery rotor structures;
(3) Dual moving type structures in which the magnetic field structure and electric machinery rotor both are rotary;
(4) Linear electric driving.

In addition, the electric machinery structure of the invention may include:

(1) Cylindrical rotating electric machinery structures;
(2) Tapered rotating electric machinery structures;
(3) Linear electric machinery structures.

To sum up, the invention provides axial rotor activation modulation of electric machinery due to reverse torque between the transmission shaft of the electric machinery and the electric machinery rotor or between the transmission shaft of the electric machinery and the transmission element driven as a result of a reversible activation helical structure including a helical propeller structure or a helical propeller structure with a ball or roller bearing and an axial pre-stressed spring, so that during operation of the electric machinery, by use of the reverse torque and driving direction between the electric machinery rotor and the loading, the electric machinery rotor is caused to perform axial displacement, and thereby modulate the electric machinery characteristics between the electric machinery and electric machinery magnetic field structure, pulling axial control clutch CLS100, or another selected control mechanism or testing device. The functions are precise and the ideas are innovative.

The invention claimed is:

1. An electric machine, comprising:
    a magnetic field structure;
    a rotor having a magnetic core, said rotor being arranged to rotate relative to the electric field structure;
    a helical structure situated between the rotor and a rotary shaft, and a pre-stressed spring situated at one end of the rotor, wherein said helical structure and said spring are arranged to enable axial displacement of the rotor relative to the shaft, and thereby vary electrical machinery characteristics of said electric machine, in response to reverse torque resulting from interaction between said rotor, said magnetic field structure, and a load or driving device as the shaft rotates,
    wherein when said reverse torque occurs, said rotor is displaced relative to the shaft, thereby varying said electrical machinery characteristics, and
    wherein an axial stack height of the magnetic core of the rotor is greater than an axial stack height of the magnetic field structure.

2. An electric machine as claimed in claim 1, wherein said helical structure comprises a helical structure for movably coupling said rotor and shaft.

3. An electric machine as claimed in claim 1, wherein said helical structure includes a helical nut on the rotor for engaging a corresponding helical groove structure on the shaft.

4. An electric machine as claimed in claim 1, further comprising a second pre-stressed spring situated at an opposite and of the rotor, a direction of said axial displacement depending on a direction of rotation of said shaft.

5. An electric machine as claimed in claim 1, wherein said electric machine is a motor.

6. An electric machine as claimed in claim 1, wherein said electric machine is a generator.

7. An electric machine as claimed in claim 1, wherein said magnetic field structure generates a uniform magnetic field along a length of said rotor.

8. An electric machine as claimed in claim 1, wherein electrical machinery characteristics of said rotor vary along a length of the rotor in order to vary magnetic coupling position between the rotor and the magnetic field structure with axial displacement of the rotor and thereby vary operational characteristics of the electrical machine.

9. An electric machine as claimed in claim 1, wherein physical properties of said rotor vary along a length of the rotor in order to vary magnetic coupling position between the rotor and the magnetic field structure with axial displacement of the rotor and thereby vary operational characteristics of the electrical machine.

10. An electric machine as claimed in claim 1, wherein properties of both said magnetic field structure and said rotor are varied in an axial direction to vary magnetic field density between the rotor and the magnetic field structure and thereby vary operational characteristics of the electrical machine with axial displacement of the rotor.

11. An electric machine as claimed in claim 1, wherein axial displacement of the rotor relative to the shaft causes pulling of a control clutch, transmission device, or other control or testing device.

12. An electric machine as claimed in claim 1, wherein said rotor is a squirrel-cage rotor having multiple axially-aligned sections having different electrical characteristics, whereby said electrical machinery characteristics are varied by displacement of said sections relative to said magnetic field structure.

13. An electric machine, comprising:
    a magnetic field structure;
    a rotor having a magnetic core, said rotor being arranged to rotate relative to the electric field structure;
    a helical structure situated between the rotor and a rotary shaft, and a pre-stressed spring situated at one end of the rotor, wherein said helical structure and said spring are arranged to enable axial displacement of the rotor relative to the shaft, and thereby vary electrical machinery characteristics of said electric machine, in response to reverse torque resulting from interaction between said rotor, said magnetic field structure, and a load or driving device as the shaft rotates, wherein when said reverse torque occurs, said rotor is displaced relative to the shaft, thereby varying said electrical machinery characteristics, wherein an axial stack height of the magnetic core of the rotor is greater than an axial stack height of the magnetic field structure, and further comprising an external device for controlling said axial displacement of said rotor exteriorly.

14. An electric machine as claimed in claim 13, wherein said external device is selected from the group consisting of a manual, electrical, hydraulic, or mechanical control device.

15. An electric machine as claimed in claim 13, wherein an axial length of said rotor is greater than an axial length of said magnetic field structure.

16. An electric machine as claimed in claim 13, wherein said electric machine is a generator.

17. An electric machine as claimed in claim 13, wherein magnetic field structure generates a uniform magnetic field along a length of said rotor.

18. An electric machine as claimed in claim 13, wherein electrical machinery characteristics of said rotor vary along a length of the rotor in order to vary magnetic coupling position between the rotor and the magnetic field structure with axial displacement of the rotor and thereby vary operational characteristics of the electrical machine.

19. An electric machine as claimed in claim 13, wherein physical properties of said rotor vary along a length of the rotor in order to vary magnetic coupling position between the rotor and the magnetic field structure with axial displacement of the rotor and thereby vary operational characteristics of the electrical machine.

20. An electric machine as claimed in claim 13, wherein properties of both said magnetic field structure and said rotor are varied in an axial direction to vary magnetic field density between the rotor and the magnetic field structure and thereby vary operational characteristics of the electrical machine with axial displacement of the rotor.

21. An electric machine as claimed in claim 13, wherein axial displacement of the rotor relative to the shaft causes pulling of a control clutch, transmission device, or other control or testing device.

22. An electric machine as claimed in claim 13, wherein said rotor is a squirrel-cage rotor having multiple axially-aligned sections having different electrical characteristics, whereby said electrical machinery characteristics are varied by displacement of said sections relative to said magnetic field structure.

* * * * *